United States Patent
Doi

(10) Patent No.: US 7,136,629 B2
(45) Date of Patent: Nov. 14, 2006

(54) RADIO DEVICE, RADIO DEVICE CALIBRATION SYSTEM, CALIBRATION METHOD, AND CALIBRATION PROGRAM

(75) Inventor: Yoshiharu Doi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 264 days.

(21) Appl. No.: 10/505,752

(22) PCT Filed: Feb. 25, 2003

(86) PCT No.: PCT/JP03/02086

§ 371 (c)(1),
(2), (4) Date: Aug. 26, 2004

(87) PCT Pub. No.: WO03/073649

PCT Pub. Date: Sep. 4, 2003

(65) Prior Publication Data

US 2005/0110678 A1    May 26, 2005

(30) Foreign Application Priority Data

Feb. 28, 2002    (JP) ............................ 2002-054023

(51) Int. Cl.
*H04B 7/14* (2006.01)
*H04B 17/00* (2006.01)

(52) U.S. Cl. ................. 455/115.1; 455/562.1; 455/25

(58) Field of Classification Search ............ 455/561, 455/67.11, 562.1, 115.1, 25, 63.4, 193.1, 455/129, 289; 342/417, 368, 371, 372, 375; 343/757, 835

See application file for complete search history.

(56) References Cited

U.S. PATENT DOCUMENTS

| | | | |
|---|---|---|---|
| 5,218,359 A * | 6/1993 | Minamisono | 342/383 |
| 6,292,135 B1 | 9/2001 | Takatori et al. | |
| 6,333,713 B1 * | 12/2001 | Nakagawa et al. | 342/418 |
| 6,470,194 B1 * | 10/2002 | Miya et al. | 455/562.1 |
| 6,522,898 B1 * | 2/2003 | Kohno et al. | 455/562.1 |
| 6,763,062 B1 * | 7/2004 | Kohno et al. | 375/220 |
| 6,836,674 B1 * | 12/2004 | Taniguchi et al. | 455/562.1 |
| 6,845,244 B1 * | 1/2005 | Ide et al. | 455/506 |
| 6,867,735 B1 * | 3/2005 | Song et al. | 342/377 |
| 6,888,501 B1 * | 5/2005 | Hirayama et al. | 342/377 |

(Continued)

FOREIGN PATENT DOCUMENTS

JP    10-013262    1/1998

(Continued)

OTHER PUBLICATIONS

Kikuma, Nobuyoshi, "Adaptive Signal Processing by Array Antenna." Kagaku Gijutsu Shuppan, pp. 35-49, Nov. 1998.

*Primary Examiner*—Sonny Trinh
(74) *Attorney, Agent, or Firm*—McDermott Will & Emery LLP

(57) ABSTRACT

An adaptive array radio apparatus (1010) includes an A/D converter (1200.1–1200.*n*) receiving respective signals from an array antenna for conversion into a digital signal from an analog signal, a down sampling device (1210.1–1210.*n*) receiving an output from the A/D converter (1200.1–1200.*n*) for down-sampling, and an adaptive array processing unit (1250) receiving an output from a synchronizing position estimation device (1230) to carry out adaptive array processing. In accordance with a timing adjust signal for the down sampling device (1210.1–1210.*n*), the minimum square error signal is output from the adaptive array processing unit (1250). Accordingly, calibration processing having transmission directivity of an adaptive array radio device can be carried out properly.

14 Claims, 10 Drawing Sheets

U.S. PATENT DOCUMENTS

| | | | |
|---|---|---|---|
| 6,917,337 B1* | 7/2005 | Iida et al. | 343/702 |
| 6,987,989 B1* | 1/2006 | Hiramatsu et al. | 455/562.1 |
| 2004/0135723 A1* | 7/2004 | Nakaya et al. | 342/372 |
| 2004/0140929 A1* | 7/2004 | Toda et al. | 342/372 |

FOREIGN PATENT DOCUMENTS

| | | |
|---|---|---|
| JP | 10-079618 | 3/1998 |
| JP | 2000-353997 | 12/2000 |

* cited by examiner

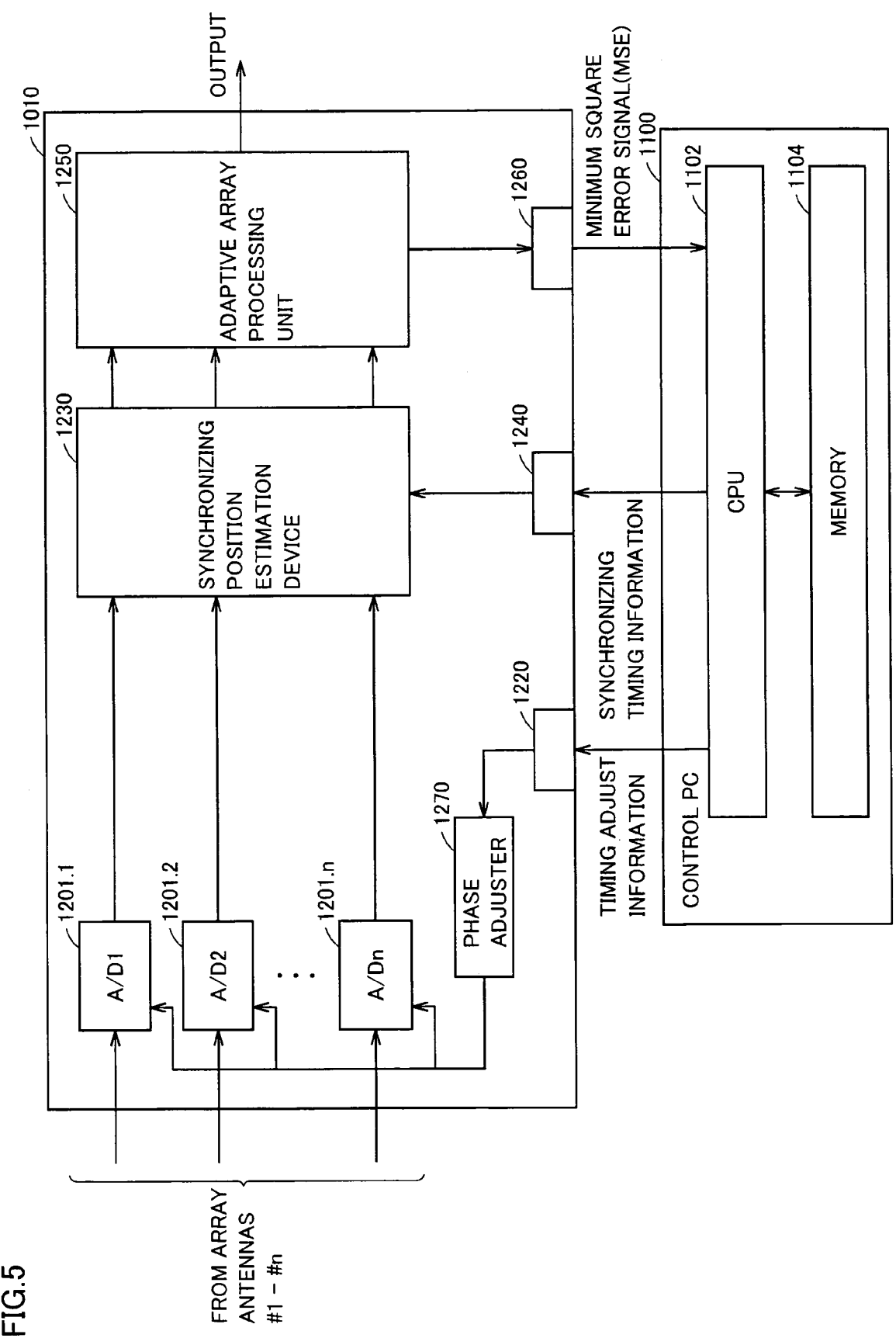

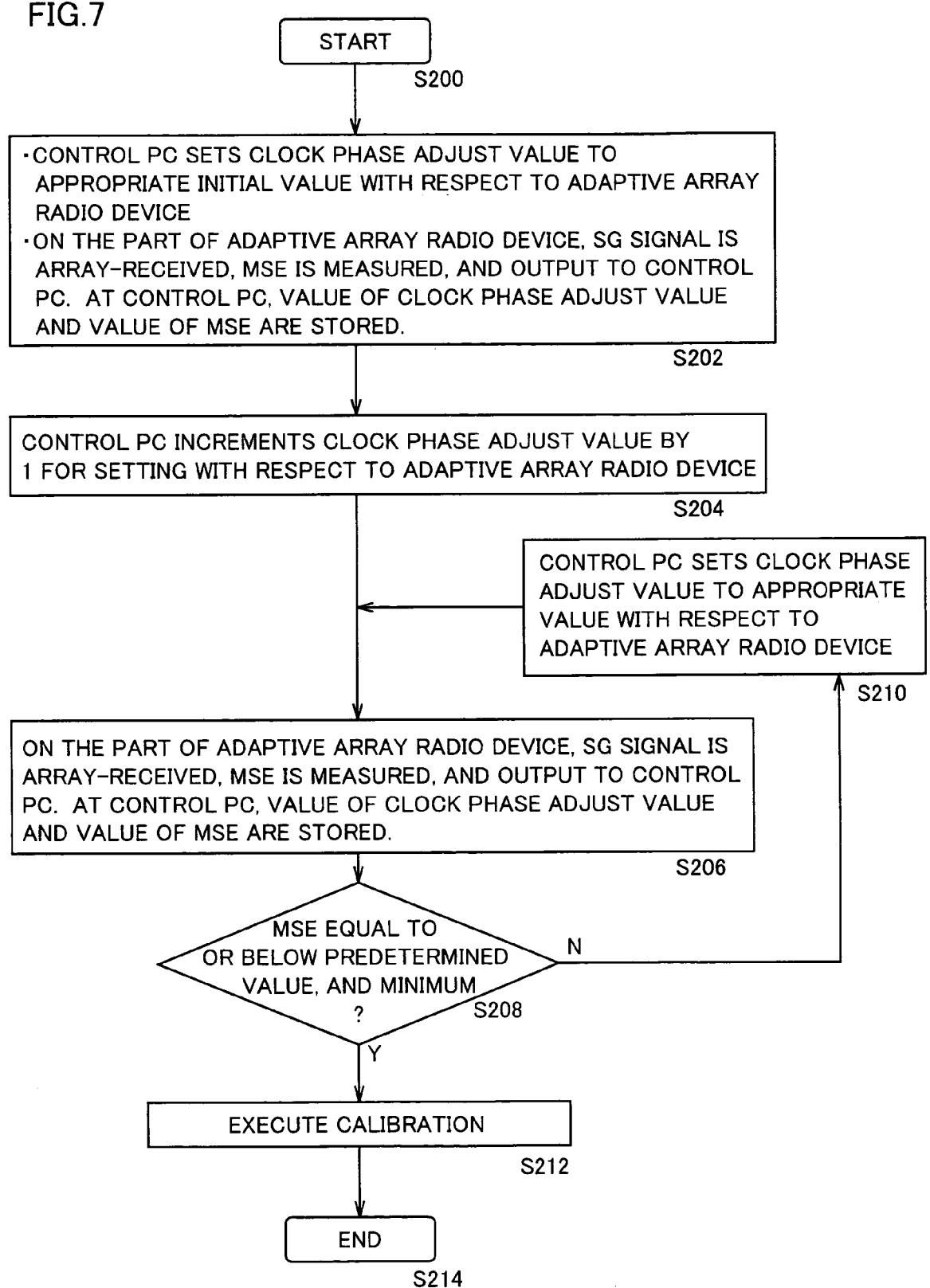

RADIO DEVICE, RADIO DEVICE CALIBRATION SYSTEM, CALIBRATION METHOD, AND CALIBRATION PROGRAM

TECHNICAL FIELD

The present invention relates to a radio apparatus that carries out adaptive array processing, a calibration system, a calibration method of transmission directivity of a radio apparatus, and a calibration program of transmission directivity.

BACKGROUND ART

In the field of mobile communication systems (for example, Personal Handyphone System: PHS) evolving rapidly these few years, a PDMA (Path Division Multiple Access) system that allows radio mobile terminal devices (hereinafter, terminal) of a plurality of users to effect spatial multiple access to a radio base system (hereinafter, base station) by dividing the same time slot of the same frequency spatially has been proposed in order to improve the usage efficiency of radio frequency.

In this PDMA system, the adaptive array technique is employed. Adaptive array processing is directed to extract a signal properly from a desired terminal by calculating a weight vector composed of reception coefficients (weight) for respective antennas of the base station for adaptive control, based on a reception signal from a terminal.

By such adaptive array processing, the uplink signal from the antenna of each user terminal is received by the array antenna of the base station, and then separated and extracted with reception directivity by the reception weights of the current user terminal.

Since there is no variation in the propagation path (the zone between the antenna end of the base station and the antenna end of the terminal) assuming that the time difference between reception and transmission at the base station is 0, the downlink signal from the base station to the relevant terminal is transmitted from the array antenna of the base station with transmission directivity towards the antenna of the relevant terminal by applying the reception weights obtained at the time of receptions as transmission weight information.

The adaptive array processing set forth above is well known in the field of art, and described in detail in, for example, "Adaptive Signal Processing by Array Antenna" (Kagaku Gijutsu Shuppan), issued Nov. 25, 1998, pp. 35–49, "Chapter 3: MMSE Adaptive Array" by Nobuyoshi Kikuma. The operating mechanism thereof will be described briefly hereinafter.

In the following description, the base station that provides downlink transmission directivity control with respect to a terminal employing such adaptive array processing will be referred to as adaptive array base station hereinafter.

In the PDMA set forth above, the signal of each user is separated using a frequency filter, time synchronization between the base station and each user mobile terminal device, and a mutual interference canceller such as an adaptive array.

FIG. 8 is a schematic block diagram showing a configuration of a transmission and reception system 2000 of a conventional base station for PDMA, realized using an adaptive array radio device.

In the configuration shown in FIG. 8, four antennas #1–#4 are provided to establish identification between a user PS1 and a user PS2.

In a reception operation, the outputs of antennas are provided to an RF circuit 2101 to be amplified by reception amplifiers, and then frequency-converted by a local oscillation signal. The converted signals have the unnecessary frequency signal removed by filters, are subjected to A/D conversion, and then applied to a digital signal processor 2102 as digital signals.

Digital signal processor 2102 includes a channel allocation reference calculator 2103, a channel allocating apparatus 2104, and an adaptive array 2100. Channel allocation reference calculator 2103 calculates in advance whether the signals from two users can be separated by the adaptive array. Based on the calculation result, channel allocating apparatus 2104 provides channel allocation information including user information, selecting frequency and time, to adaptive array 2100. Adaptive array 2100 applies a weighting operation in real time on the signals from the four antennas #1–#4 based on the channel allocation information to separate only the signals of a particular user.

[Configuration of Adaptive Array Antenna]

FIG. 9 is a block diagram showing a configuration of a transmission and reception unit 2100a corresponding to one user in adaptive array 2100. The example of FIG. 9 has n input ports 2020-1 to 2020-n to extract the signal of the desired user from input signals including the signals of a plurality of users.

The signals input to respective input ports 2020-1 to 2020-n are applied via respective switch circuits 2010-1 to 2010-n to a weight vector control unit 2011 and respective multipliers 2012-1 to 2012-n.

Weight vector control unit 2011 calculates weight vectors $w_{1i}$–$w_{ni}$ using input signals, a unique word signal corresponding to the signal of a particular user stored in advance in memory 2014, and the output of an adder 2013. As used herein, subscript "i" implies that the weight vector is employed for transmission/reception with the i-th user.

Multipliers 2012-1 to 2012-n multiply the input signals from input ports 2020-1 to 2020-n by weight vectors $w_{1i}$–$w_{ni}$, respectively. The multiplied result is applied to adder 2013. Adder 2013 adds the output signals from multipliers 2012-1 to 2012-n to output the added signals as a reception signal $S_{RX}(t)$. This reception signal $S_{RX}(t)$ is also applied to weight vector control unit 2011.

Transmission and reception unit 2100a further includes multipliers 2015-1 to 2015-n receiving an output signal $S_{TX}(t)$ to be transmitted from the adaptive array radio base station to multiply the same by respective weight vectors $w_{1i}$–$w_{ni}$ applied from weight vector control unit 2011 for output. The outputs of multipliers 2015-1 to 2015-n are applied to switch circuits 2010-1 to 2010-n, respectively. Specifically, switch circuits 2010-1 to 2010-n provide the signals applied from input ports 2020-1 to 2020-n to a signal receiver unit 1R in a signal receiving mode, and provides the signal from a signal transmitter unit 1T to input/output ports 2020-1 to 2020-n in a signal transmission mode.

[Operating Mechanism of Adaptive Array]

The operating mechanism of transmission and reception unit 2100a of FIG. 9 will be described briefly here.

For the sake of simplfying the description hereinafter, it is assumed that there are four antenna elements, and two users PS effect communication at the same time. In such a case, signals applied to reception unit 1R from respective antennas are represented by the equations set forth below.

$$RX_1(t) = h_{11}Srx_1(t) + h_{12}Srx_2(t) + n_1(t) \quad (1)$$

$$RX_2(t) = h_{21}Srx_1(t) + h_{22}Srx_2(t) + n_2(t) \quad (2)$$

$$RX_3(t) = h_{31}Srx_1(t) + h_{32}Srx_2(t) + n_3(t) \quad (3)$$

$$RX_4(t) = h_{41}Srx_1(t) + h_{42}Srx_2(t) + n_4(t) \quad (4)$$

Signal $RX_j(t)$ represents a reception signal of the j-th (j=1, 2, 3, 4) antenna. Signal $Srx_i(t)$ represents a signal transmitted by the i-th (i=1, 2) user.

Coefficient $h_{ji}$ represents the complex coefficient of a signal from the i-th user received at the j-th antenna, and $n_j(t)$ represents the noise included in the j-th reception signal.

The above equations (1)–(4) may be represented in vector form as follows:

$$X(t)=H_1 Srx_1(t)+H_2 Srx_2(t)+N(t) \quad (5)$$

$$X(t)=[RX_1(t), RX_2(t), \ldots RX_4(t)]^T \quad (6)$$

$$H_i=[h_{1i}, h_{2i}, \ldots, h_{4i}]^T, (i=1, 2) \quad (7)$$

$$N(t)=[n_1(t), n_2(t), \ldots n_4(t)]^T \quad (8)$$

In equations (6)–(8), [ ]$^T$ denotes the transposition of [. . . ]. Here, X (t) represents the input signal vector, $H_i$ the reception signal coefficient vector of the i-th user, and N (t) a noise vector.

The adaptive array antenna outputs as a reception signal $S_{RX}(t)$ a synthesized signal obtained by multiplying the input signals from respective antennas by respective weight coefficients $w_{1i}$–$w_{ni}$, as shown in FIG. 9.

Given these preliminaries, the operation of an adaptive array in the case of extracting a signal $Srx_1(t)$ transmitted by, for example, the first user is set forth below.

Output signal y1 (t) of adaptive array 2100 can be represented by the following equations by multiplying input signal vector X(t) by weight vector $W_1$.

$$y1(t)=X(t)W_1^T \quad (9)$$

$$W_1=[W_{11}, W_{21}, W_{31}, W_{41}]^T \quad (10)$$

In other words, weight vector $W_1$ is a vector with the weight coefficients $w_{j1}$ (j=1, 2, 3, 4) to be multiplied by the j-th input signals RXj (t) as elements.

Substituting input signal vector X (t) represented by equation (5) into y1(t) represented by equation (9) yields:

$$y1(t)=H_1 W_1^T Srx_1(t)+H_2 W_1^T Srx_2(t)+N(t)W_1^T \quad (11)$$

By a well known method, weight vector $W_1$ is sequentially controlled by weight vector control unit 2011 so as to satisfy the following simultaneous equations when adaptive array 2100 operates in an ideal situation. As used herein, the adaptive array processing to obtain such weight vectors determines the optimum weight by minimizing the difference (error signal) between the reference signal that is the desired array response and the actual array output signal. In this minimization of the error signal, the minimum mean square error (MMSE) method is employed.

$$H_1 W_1^T=1 \quad (12)$$

$$H_2 W_1^T=0 \quad (13)$$

If weight vector $W_1$ is perfectly controlled so as to satisfy equations (12) and (13), output signal y1(t) from adaptive array 2100 is eventually represented by the following equations.

$$y1(t)=Srx_1(t)+N_1(t) \quad (14)$$

$$N_1(t)=n_1(t)w_{11}+n_2(t)W_{21}+n_3(t)W_{31}+n_4(t)W_{41} \quad (15)$$

Specifically, signal $Srx_1(t)$ emitted from the first of the two users will be obtained for output signal y1(t).

In FIG. 9, input signal $S_{TX}(t)$ for adaptive array 2100 is applied to transmitter unit 1T in adaptive array 2100 to be applied to respective one inputs of multipliers 2015-1, 2015-2, 2015-3, . . . , 2015-n. To the other inputs of these multipliers, weight vectors $w_{1i}, w_{2i}, w_{3i}, \ldots, w_{ni}$ calculated by weight vector control unit 2011 based on reception signals described above are copied and applied.

The input signals weighted by these multipliers are delivered to corresponding antennas #1, #2, #3, . . . , #n via corresponding switches 2010-1, 2010-2, 2010-3, 2010-n for transmission.

Identification of users PS1 and PS2 is made as set forth below. A radio wave signal of a cellular phone is transmitted in frame form. The radio wave signal of a cellular phone is mainly composed of a preamble formed of a signal series known to a radio base station, and data (voice and the like) formed of a signal series unknown to the radio base station.

The preamble signal series includes a signal stream of information to identify whether the current user is the appropriate user to converse for the radio base station. Weight vector control unit 2011 of adaptive array radio base station 1 compares the unique word signal corresponding to user A output from memory 2014 with the received signal series to conduct weight vector control (determine weight coefficients) so as to extract the signal expected to include the signal series corresponding to user PS1.

[Calibration of Adaptive Array Radio Device]

However, even if there is no variation in the propagation path, difference in transmission characteristics such as in the phase rotation and amplitude variation between transmission and reception signals will occur between the reception signal path and the transmission signal path due to the physical difference between the reception signal path and the transmission signal path in the adaptive array base station (for example, due to the difference in the path length, difference in the properties of the device such as amplifiers and filters included in the reception circuit and the transmission circuit, and the like).

If there is difference in the transmission characteristics between the transmission and reception signals within the adaptive array base station, the optimum transmission directivity cannot be directed to the terminal of the transmission destination based on the method that directly employs the reception weight set forth above as the transmission weight.

Thus, calibration is generally carried out to compensate for the difference between the transmission characteristic of the reception signal path and the transmission characteristic of the transmission signal path within the base station at the time of shipment from the factory to achieve the optimum transmission directivity.

FIG. 10 is a schematic block diagram to describe the configuration of a calibration system 3000 directed to conducting, at the time of shipment from the factory, calibration with respect to adaptive array base station 3010 identified as the base station.

Referring to FIG. 10, calibration-system 3000 includes an adaptive array radio device 3010 that is the subject of calibration, a clock generator 3020 to generate a reference clock for the calibration mode, signal generators 3030.1 and 3030.2 generating modulating signals to be used for calibration, a spectrum analyzer 3040 to measure the power of a signal transmitted from adaptive array radio device 3010, a power divider 3060 arranged between signal generators 3030.1, 3030.2 and adaptive array radio device 3010, a circulator 3050 to selectively pass through a signal in a direction from a node corresponding to signal generator 3030.2 of power divider 3060 towards spectrum analyzer 3040 and in a direction from signal generator 3030.2 towards power divider 3060, attenuators 3070.1-3070.n provided between the nodes corresponding to the plurality of antennas of adaptive array radio device 3010 and the plurality of input/output nodes of the power divider, and a control personal computer (referred to as "control PC" hereinafter) 3100 to control the calibration operation.

Power divider 3060 may be a Butler matrix.

A conventional calibration operation will be described briefly hereinafter.

Based on a measurement device control signal from control PC 3100, signal generators 3030.1 and 3030.2 generate modulating signals for calibration. These modulating signals are applied to adaptive array radio device 3010 via power divider 3060 and attenuators 3070.1-3070.n.

At adaptive array radio device 3010, the transmission weight is adjusted so as to have directivity with respect to a signal from signal generator 3030.1 in accordance with the radio device control signal from control PC 3100. If the transmission characteristic of the reception signal path matches the transmission characteristic of the transmission signal path of adaptive array radio device 3010 in this state of affairs, the power of the signal towards signal generator 3030.2, i.e. the power detected by spectrum analyzer 3040, should be "0".

However, in practice, there is deviation in the transmission characteristic of the reception signal path from the transmission characteristic of the transmission signal path in adaptive array radio device 3010. Therefore, a correction value must be applied to the amplitude and phase of the transmission weight calculated at adaptive array radio device 3010 so as to adjust the power detected at spectrum analyzer 3040 to become "0".

To this end, the correction values to be applied to the amplitude and phase of the transmission weight calculated at adaptive array radio device 3101 are sequentially modified while monitoring the measurement value of spectrum analyzer 3040 to find an optimum correction value.

By such a procedure, calibration can be conducted with respect to adaptive array radio device 3010.

However, in the conventional calibration system 3000 set forth above, the reception timing of adaptive array radio device 3010 is in synchronization with the signal output timing of signal generators 3030.1 and 3030.2 of the measurement system based on a clock signal from a common clock generator 3020.

If the sampling timing of analog-digital conversion (A/D conversion) carried out during signal processing at adaptive array radio device 3010 is an integral multiple of or is 1/integer times the external clock in such a system, the timing between the measurement system and adaptive array radio device 3010 can be made to match without any error. In practice, the sampling timing of A/D conversion is not an integral multiple of or 1/integer times the external clock. Therefore, there is some error between the timings thereof. Thus, there was a problem that there is an error in the calibration correction value.

It is to be further noted that calibration processing is carried out with the synchronization of the reception signal fixed, based on the assumption that the apparatus is configured so as to establish synchronization between the measurement system and adaptive array radio device 3010. However, even with such measurement form based on fixation, the occasion arises where there is deviation of approximately several symbols in synchronization between adaptive array radio device 3010 and the measurement system due to aging and the like. There was a problem that the clock must be adjusted again on such events.

In view of the foregoing, an object of the present invention is to provide a radio apparatus that can conduct calibration processing of transmission directivity properly for an adaptive array radio device, a calibration system, a calibration method of transmission directivity, and a calibration program of transmission directivity.

DISCLOSURE OF THE INVENTION

According to an aspect of the present invention, a radio apparatus that carries out signal reception by adaptive array processing includes a plurality of antennas, and signal conversion means sampling signals from the plurality of antennas for conversion into a digital signal from an analog signal. The signal conversion means has a variable timing of sampling in accordance with a timing adjust signal. The radio apparatus further includes adaptive array processing means for calculating, based on a signal from the signal conversion means, a reception weight to extract a desired signal, and a transmission weight to form a pattern of desired transmission directivity. The adaptive array processing means outputs match information that provides an indication of the desired reception directivity being achieved in the calculation of the reception weight. The radio apparatus further includes a first interface to receive the timing adjust signal from outside the radio apparatus, and a second interface to output the match information outside the radio apparatus.

Preferably, the signal conversion means includes A/D conversion means for sampling a signal from the plurality of antennas at a first frequency, and down sampling means for sampling at a second frequency lower than the first frequency the signal sampled at the first frequency. The down sampling means modifies the sampling timing at the second frequency in accordance with the timing adjust signal.

Preferably, the down sampling means modifies a sampling timing at the second frequency in units of timing intervals corresponding to the first frequency in accordance with the timing adjust signal.

Preferably, the signal conversion means includes A/D conversion means for sampling a signal from the plurality of antennas at a first frequency, and means for adjusting a phase of an internal clock defining the sampling timing at the first frequency by the A/D conversion means in accordance with the timing adjust signal.

According to another aspect of the present invention, a calibration system to calibrate a transmission directivity of a radio apparatus that carries out signal reception by adaptive array processing using a plurality of antennas includes control means for controlling a calibration operation, and a plurality of signal generation means for generating respective plurality of test signals to be applied to the radio apparatus under control of the control means. The radio apparatus includes signal conversion means sampling a signal from the plurality of antennas for conversion into a digital signal from an analog signal. The signal conversion means has a variable timing of sampling in accordance with a timing adjust signal. The radio apparatus further includes adaptive array processing means for calculating, based on a signal from the signal conversion means, a reception weight to extract a desired signal, and a transmission weight to form a pattern of a desired transmission directivity. The adaptive array processing means outputs match information that provides an indication of the desired reception directivity being achieved in the calculation of a reception weight. The radio apparatus further includes a first interface for receiving a timing adjust signal from the control means, and a second interface for providing the match information to the control means. The control means determines a level of the timing adjust signal by which the desired reception directivity is achieved, based on correspondence between the timing adjust signal and the match information.

Preferably, the calibration system further includes detection means, provided corresponding to at least one of the plurality of signal generation means, for detecting a level of a signal output from the radio apparatus with respect to a corresponding signal generation means under control of the control means. The control means determines a correction value for the transmission weight in accordance with a detected result of the detection means.

Preferably, the signal conversion means includes A/D conversion means for sampling a signal from the plurality of antennas at a first frequency, and down sampling means for sampling at a second frequency lower than the first frequency the signal sampled at the first frequency. The down sampling means modifies a sampling timing at the second frequency in accordance with the timing adjust signal.

Preferably, the signal conversion means includes A/D conversion means for sampling a signal from the plurality of antennas at the first frequency, and means for adjusting a phase of an internal clock defining the sampling timing at the first frequency by the A/D conversion means in accordance with the timing adjust signal.

According to a further aspect of the present invention, a calibration method of transmission directivity at a radio apparatus that carries out signal reception by adaptive array processing using a plurality of antennas includes the steps of generating respective plurality of test signals to be applied to the radio apparatus, sampling a signal from the plurality of antennas for conversion into a digital signal from an analog signal at the radio apparatus, modifying a sampling timing at the signal conversion step in accordance with a timing adjust signal, calculating a reception weight to extract a desired signal based on a signal-converted signal to output match information that provides an indication of a desired reception directivity being achieved, determining a level of the timing adjust signal by which the desired reception directivity is achieved based on the corresponding relationship between the timing adjust signal and the match information, obtained by sequentially modifying a level of the timing adjust signal, calculating a transmission reception weight to form a pattern of a desired transmission directivity at the determined level of a timing adjust signal, detecting a level of the signal output from the radio apparatus corresponding to the transmission weight, and determining the correction value for the transmission weight in accordance with a detected result of the signal level.

Preferably, the signal conversion step includes the steps of sampling a signal from the plurality of antennas at a first frequency, sampling at a second frequency lower than the first frequency the signal sampled at the first frequency, and modifying the a sampling timing at the second frequency in accordance with the timing adjust signal.

Preferably, the signal conversion step includes the steps of sampling a signal from the plurality of antennas at a first frequency, and adjusting a phase of an internal clock defining the sampling timing at the first frequency in accordance with the timing adjust signal.

According to still another aspect of the present invention, a calibration program of transmission directivity at a radio apparatus that carries out signal reception by adaptive array processing using a plurality of antennas causes a computer to execute the steps of generating respective plurality of test signals to be applied to the radio apparatus, sampling a signal from the plurality of antennas for conversion into a digital signal from an analog signal for the radio apparatus, modifying a sampling timing at the signal conversion step in accordance with a timing adjust signal for the radio apparatus, calculating a reception weight to extract a desired signal based on a signal-converted signal and outputting match information that provides an indication of a desired reception directivity being achieved with respect to the radio apparatus, determining a level of the timing adjust signal by which the desired reception directivity is achieved based on the corresponding relationship between the timing adjust signal and the match information, obtained by sequentially modifying the level of the timing adjust signal, calculating a transmission weight to form a pattern of the desired transmission directivity at the determined level of a timing adjust signal with respect to the radio apparatus, detecting a level of the signal output from the radio apparatus corresponding to the transmission weight, and determining a correction value for the transmission weight in accordance with a detected result of the signal level.

Preferably, the signal conversion step includes the steps of sampling a signal from the plurality of antennas at the first frequency, sampling at a second frequency lower than the first frequency the signal sampled at the first frequency, and modifying a sampling timing at the second frequency in accordance with the timing adjust signal.

Preferably, the signal conversion step includes the steps of sampling a signal from the plurality of antennas at a first frequency, and adjusting a phase of an internal clock defining the sampling timing at the first frequency in accordance with the timing adjust signal.

BRIEF DESCRIPTION OF THE DRAWINGS

FIG. 5 is a block diagram to describe in further detail a configuration of an adaptive array radio device 1010 and a configuration of control PC 1100 according to a second embodiment of the present invention.

FIG. 7 is a flow chart to describe an operation of calibration system 1000 according to the second embodiment of the present invention.

BEST MODES FOR CARRYING OUT THE INVENTION

Embodiments of the present invention will be described in detail hereinafter with reference to the drawings.

Figure 1:
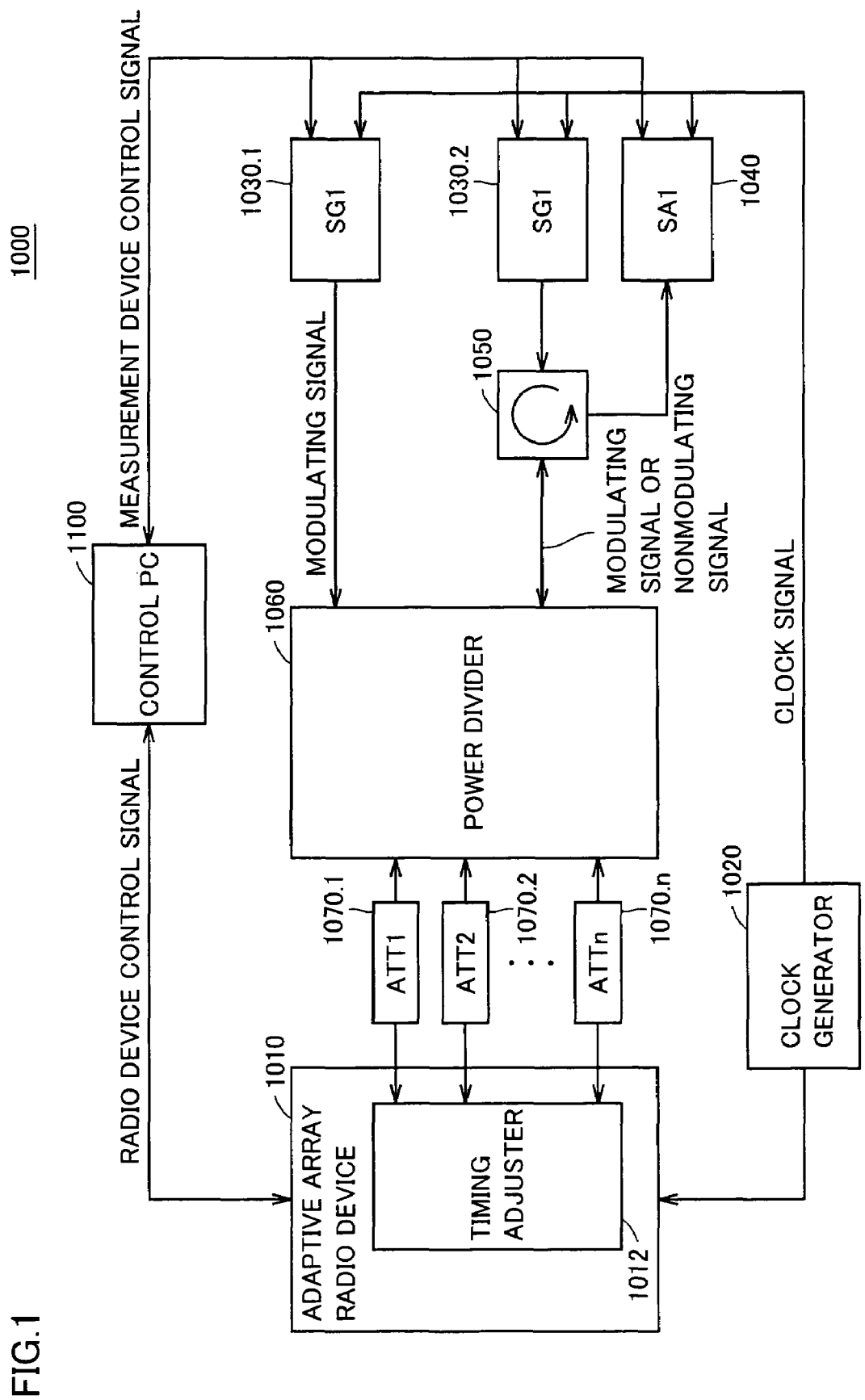
FIG. 1 is a schematic block diagram to describe a configuration of a calibration system 1000 of the present invention.

FIG. 1 is a schematic block diagram to describe a configuration of a calibration system 1000 of the present invention for carrying out, at the time of shipment from the factory, calibration for an adaptive array radio device 1010 identified as a base station.

Referring to FIG. 1, a calibration system 1000 includes an adaptive array radio device 1010 that is the subject of calibration, a clock generator 1020 to generate a reference clock for calibration, signal generators 1030.1 and 1030.2 generating modulating signals to be used for calibration, a spectrum analyzer 1040 to measure the power of a signal transmitted from adaptive array radio device 1010, a power divider 1060 arranged between signal generators 1030.1, 1030.2 and adaptive array radio device 1010, a circulator 1050 to selectively pass through a signal in a direction from a node corresponding to signal generator 1030.2 of power divider 1060 towards spectrum analyzer 1040 and in a direction from signal generator 1030.2 towards power divider 1060, attenuators 1070.1–1070.n arranged between nodes corresponding to the plurality of antennas of adaptive array radio device 1010 and the plurality of input/output nodes of the power divider, and a control PC 1100 to control the calibration operation.

Power divider 1060 may be a Butler matrix.

The control PC is installed with a program to calibrate adaptive array radio device 1010 upon implementing the procedure to compensate for sampling timing error in A/D conversion of adaptive array radio device 1010.

Additionally, a timing adjuster 1012 to set a variable timing of sampling in A/D conversion in accordance with the control of the control PC is provided at adaptive array radio device 1010.

[First Embodiment]

Figure 2:
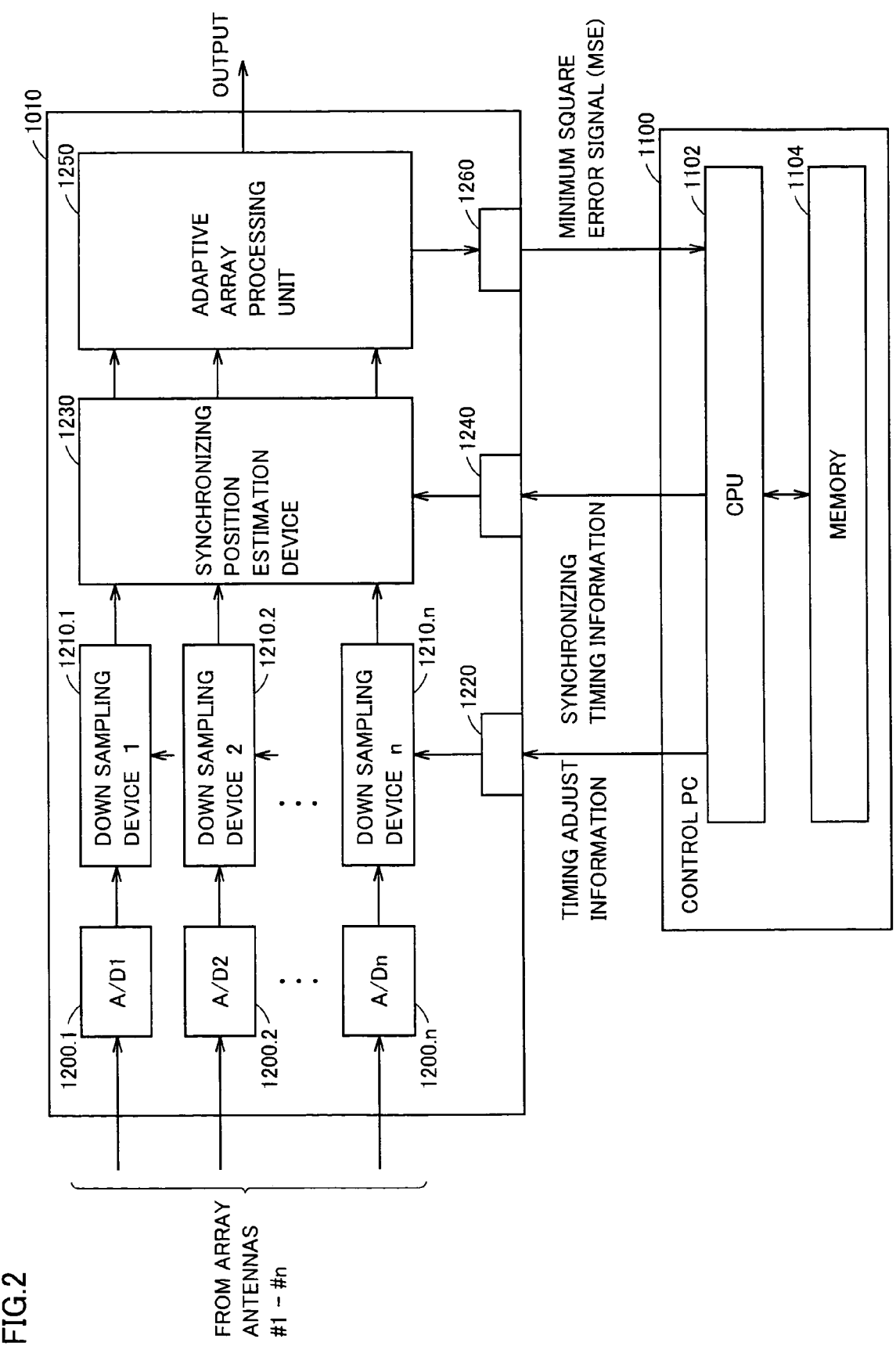
FIG. 2 is a block diagram to describe in further detail a configuration of an adaptive array radio device 1010 and a configuration of control PC 1100 according to a first embodiment of the present invention.

FIG. 2 is a block diagram to describe in further detail a configuration of adaptive array radio device 1010 and a configuration of control PC 1100 according to the first embodiment of the present invention.

Figure 9:
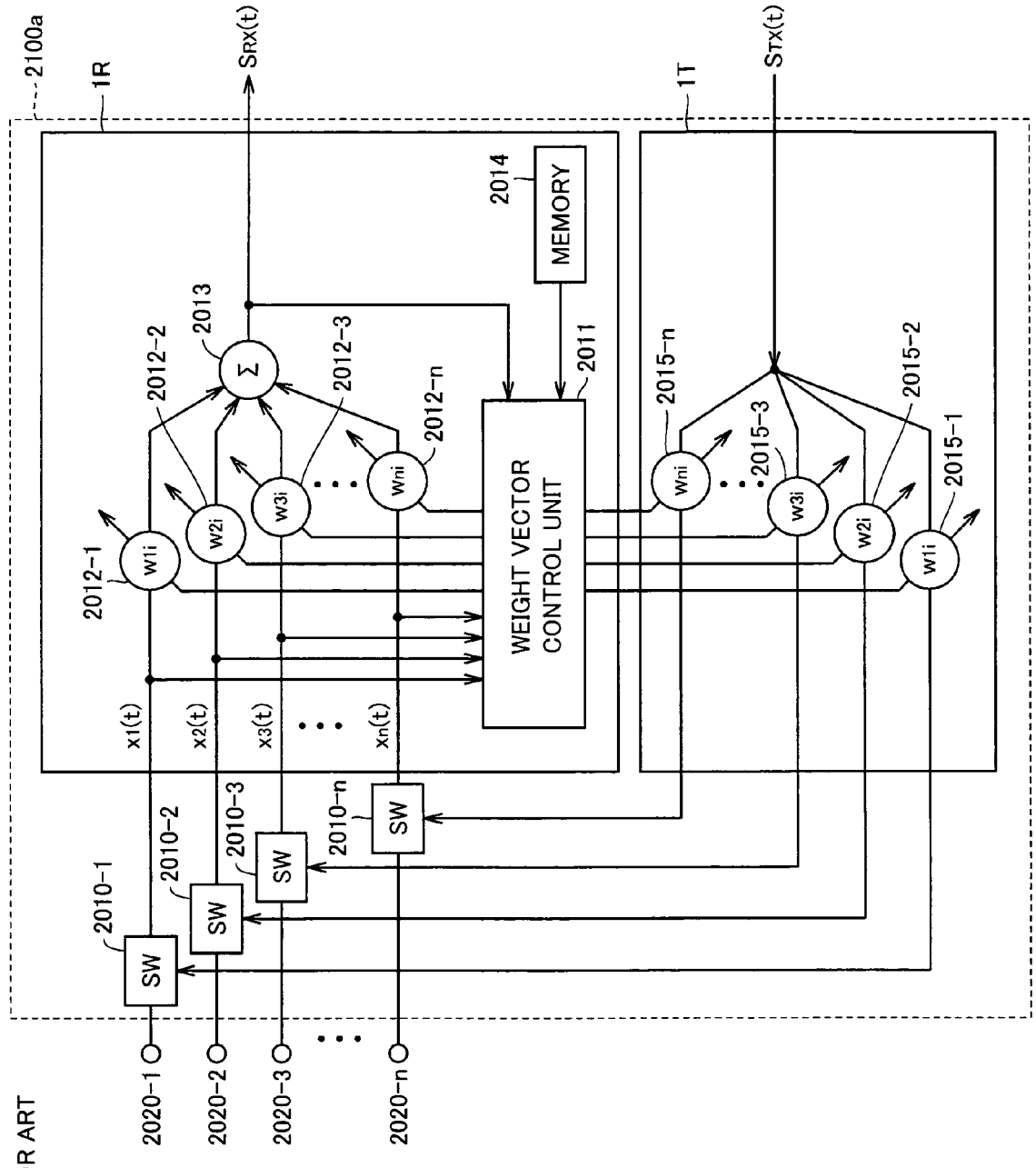
FIG. 9 is a block diagram showing a configuration of a transmission and reception unit 2100a corresponding to one user in adaptive array 2100.
Figure 10:
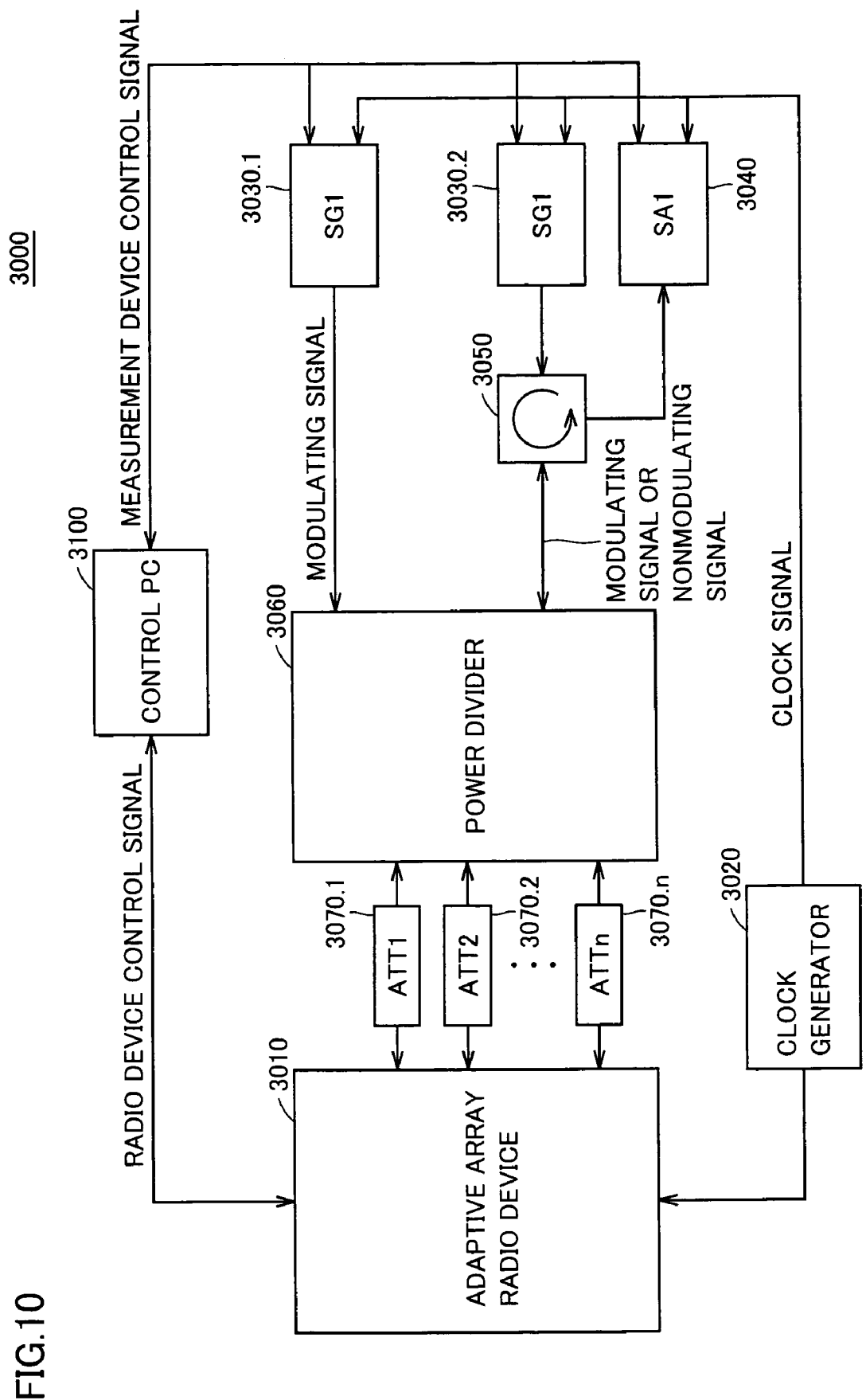
FIG. 10 is a schematic block diagram to describe a configuration of a calibration system 3000.

In the configuration of adaptive array radio device 1010, the elements in direct relation with calibration, though not illustrated, are provided in practice as described with reference to FIG. 9.

The signal transmitted between a base station and a terminal is divided into a plurality of frames. The signals of 1 frame are divided into 8 slots, the 4 slots of the former half directed to, for example, reception, and the 4 slots of the latter half directed to, for example, transmission.

Each slot is formed of 120 symbols. Based on one set of one slot for reception and one slot for transmission, the signal of 1 frame can be allocated to, for example, up to 4 users.

Referring to FIG. 2, adaptive array radio device 1010 includes A/D converters 1200.1–1200.n receiving respective signals from antennas #1–#n constituting the array antenna to carry out sampling at a timing defined by an internal clock supplied from a clock generation device not shown and at a predetermined frequency for conversion into a digital signal from an analog signal, down sampling devices 1210.1–1210.n receiving outputs from A/D converters 1200.1–1200.n to carry out down sampling until a frequency to carry out calculation of adaptive array processing is achieved. As will be described afterwards, each of down sampling devices 1210.1–1210.n can modify the timing of down sampling in accordance with a control signal applied from control PC 1100 via interface 1220. A/D converters 1200.1–1200.n and down sampling devices 1210.1–1210.n correspond to timing adjuster 1012.

Adaptive array radio device 1010 further includes a synchronizing position estimation device 1230 receiving outputs from down sampling devices 1210.1–1210.n to detect the head position of a reception signal slot, an interface 1240 receiving and applying to synchronizing position estimation device 1230 a control signal from control PC 1100, an adaptive array processing unit 1250 receiving the output of synchronizing position estimation device 1230 to carry out adaptive array processing, and an interface 1260 applying from control PC 1100 to adaptive array processing unit 1250 a correction value for the amplitude and phase to be applied to the transmission weight, or applying to the control PC a minimum square error signal (MSE) that provides an indication of a desired directivity being achieved in carrying out adaptive array processing in adaptive array processing unit 1250.

Although only the configuration for receiving a signal is depicted in FIG. 2, adaptive array processing unit 1250 calculates, in practice, a transmission weight to provide a desired transmission directivity based on the received signal. Based on the transmission weight, a radio wave having transmission directivity for a desired terminal is output, likewise FIG. 9, with respect to the transmission signal from adaptive array radio device 1010. At this stage, the transmission weight is subjected to correction based on the correction value set forth above.

Control PC 1100 includes a central processing unit (CPU) 1102 carrying out an operation to control the calibration processing that will be described hereinafter in accordance with the control program, and a memory 1104 to store, in addition to the aforementioned control program, the timing adjustment with respect to down sampling devices 1210.1–1210.n and the minimum square error signal in association, as will be described afterwards.

Figure 3A:
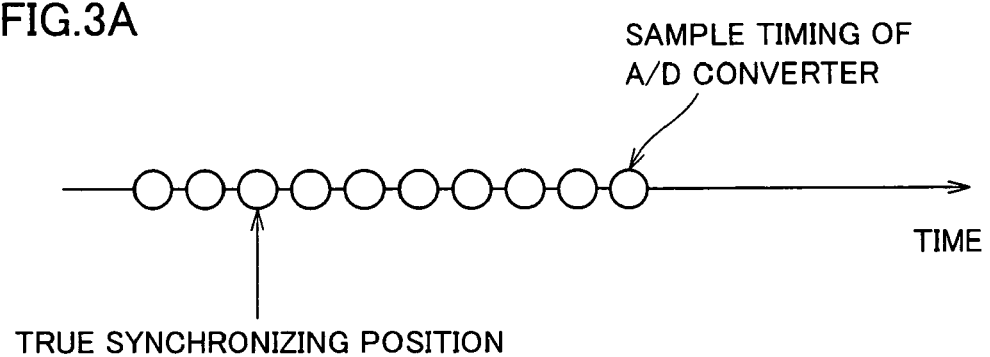
FIGS. 3A–3C are diagrams representing the sampling timing of respective elements in calibration system 1000 according to the first embodiment of the present invention.
Figure 3B:
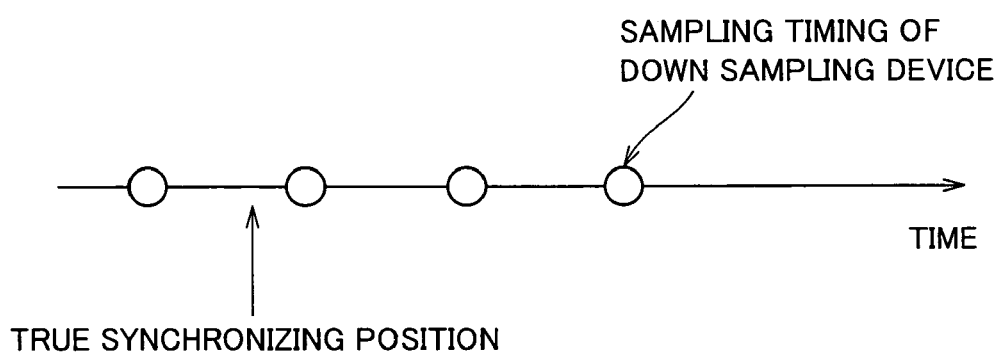
Figure 3C:
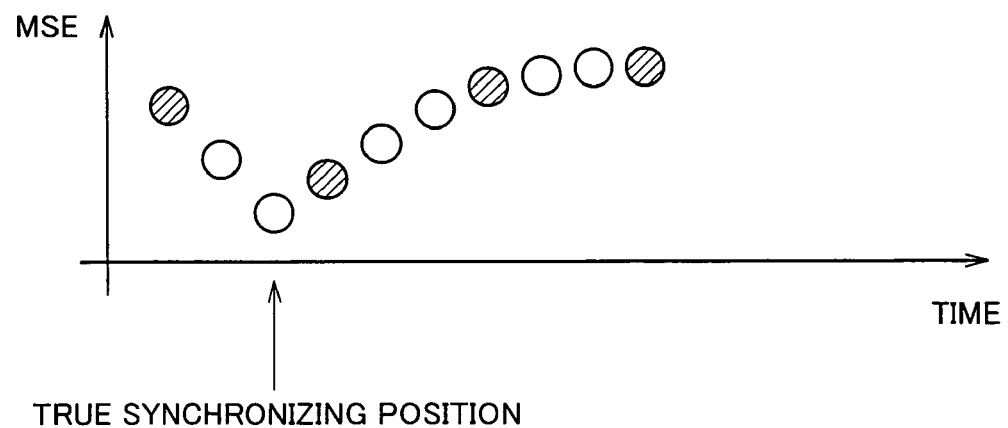

FIGS. 3A–3C represent the sampling timing of respective elements in calibration system 1000 according to the first embodiment of the present invention. FIG. 3A represents the sampling timing of A/D converters 1200.1–1200.n. FIG. 3B represents the sampling timing of down sampling devices 1210.1–1210.n. FIG. 3C represents the minimum square error signal (MSE) stored in memory 1104 while the timing of down sampling devices 1210.1–1210.n is adjusted.

As shown in FIG. 3A, the sampling by A/D converters 1200.1–1200.n is carried out at a frequency higher than the frequency of the sampling by down sampling devices 1200.1–1200.n of FIG. 3B.

Therefore, if sampling is carried out by down sampling devices 1210.1–1210.n at the timing of, for example, FIG. 3B, the minimum square error signal values as indicated by the black circle in FIG. 3C are obtained.

By gradually altering the timing of sampling of down sampling devices 1210.1–1210.n shown in FIG. 3B in steps of the sampling time interval of A/D converters 1200.1–1200.n in accordance with the control signals from control PC 1100, data equivalent to that obtaining the characteristics as represented by the open circles and hatched circles in FIG. 3C can be eventually obtained.

Therefore, even in the case where the sampling timing of A/D conversion is not based on an integral multiple of or 1/integer times the external clock, the true synchronizing position can be found. Thus, calibration is carried out.

Figure 4:
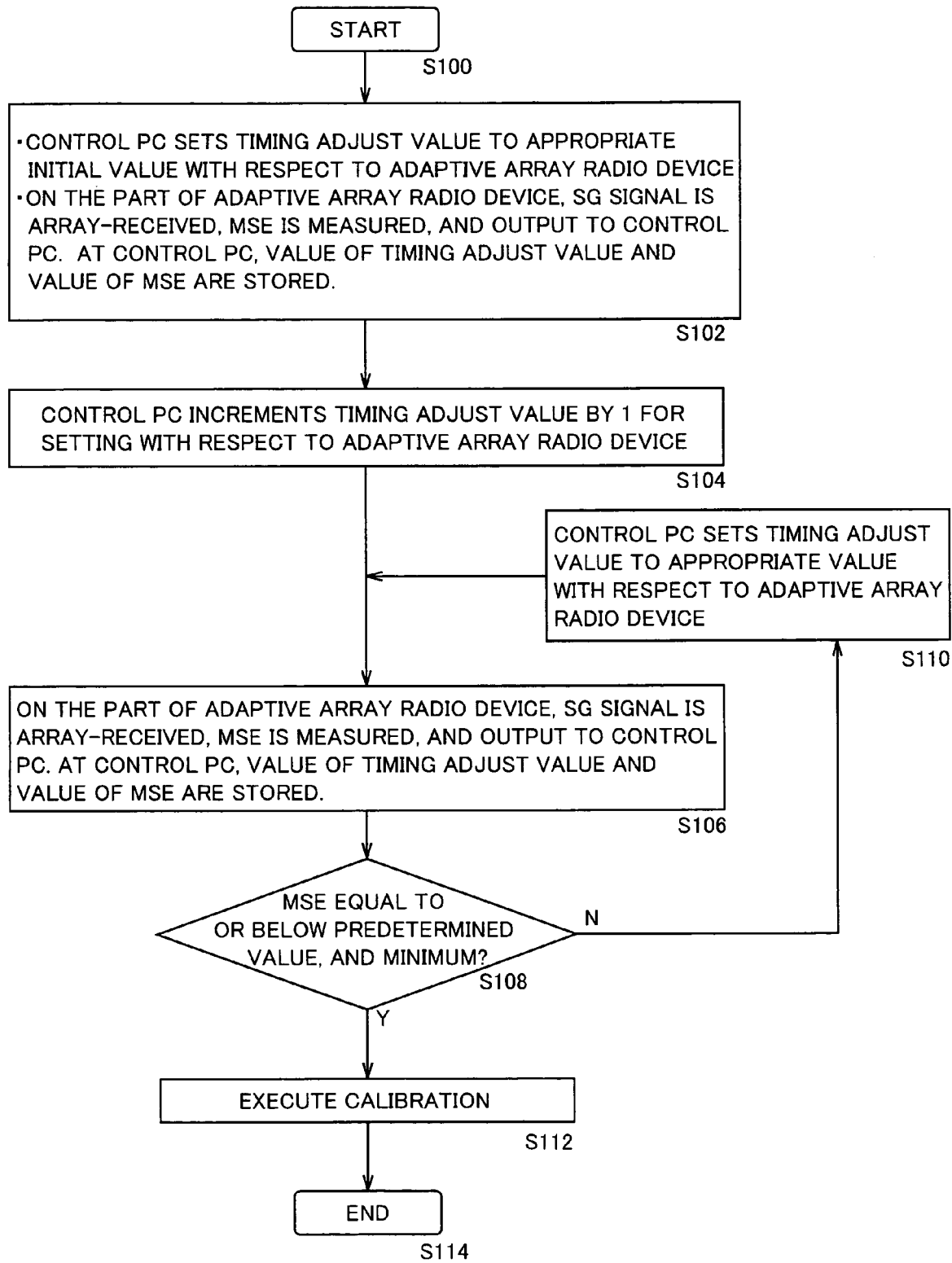
FIG. 4 is a flow chart to describe an operation of calibration system 1000 according to the first embodiment of the present invention.

FIG. 4 is a flow chart to describe the operation of calibration system 1000 according to the first embodiment.

Upon initiation of calibration (step S100), control PC 1100 outputs an instruction to adaptive array radio device 1010 (base station) to set the timing of sampling of down sampling devices 1210.1–1210.n to an appropriate initial value. Adaptive array radio device 1010 receives signals (SG signal) from signal generators 1030.1 and 1030.2 to measure the minimum square error signal value (MSE), and notifies control PC 1100 the measured minimum square error signal value. Control PC 1100 stores the value of the timing adjustment and the value of the minimum square error signal value in correspondence (step S1012).

Control PC 1100 instructs that the sampling timing of down sampling devices 1210.1–1210.n in adaptive array radio device 1010 is to be modified by just one step of the sampling time interval of A/D converters 1200.1–1200.n (step S104).

Then, adaptive array radio device 1010 receives the SG signal, measures the minimum square error signal value (MSE), and notifies control PC 1100 the newly measured minimum square error signal value. Control PC 1100 stores the value of the timing adjustment and the value of the minimum square error signal value in correspondence (step S106).

Control PC 1100 determines whether the minimum square error signal value is equal to or below a predetermined value, and can be identified as the minimum value (step S108).

When not identified as the minimum, an instruction is output to modify the sampling timing of down sampling devices 1210.1–1210.n in adaptive array radio device 1010 to an appropriate value, for example, modify the timing by just one step of the sampling time interval of A/D converters 1200.1–1200.n (step S110). Then, the process returns to step S106.

When determination is made that the minimum square error signal value is equal to or below a predetermined value and can be identified as the minimum at control PC 1100, calibration is executed in a manner similar to that of the conventional case with the timing adjust value fixed corresponding to the minimum (step S112). Thus, the calibration processing ends (step S114).

By the above-described configuration, the calibration processing of transmission directivity of an adaptive array radio device can be carried out properly.

Second Embodiment

FIG. 5 is a block diagram to describe in further detail a configuration of adaptive array radio device 1010 and control PC 1100 according to a second embodiment of the present invention.

Referring to FIG. 5, adaptive array radio device 1010 includes A/D converters 1201.1–1201.n receiving respective signals from antennas #1–#n constituting the array antenna to carry out sampling at a timing defined by an internal clock supplied from a clock generation device not shown and at a predetermined frequency directed to carrying out the calculation of adaptive array processing for conversion into a digital signal from an analog signal. Each of A/D converters 1201.1–1201.n can modify the clock phase that determines the timing of sampling in accordance with a clock phase adjust signal supplied from a phase adjuster 1270 based on a control signal applied from control PC 1100 via interface 1220. A/D converters 1201.1–1201.n and phase adjuster 1270 correspond to timing adjuster 1012.

Adaptive array radio device 1010 further includes a synchronizing position estimation device 1230 receiving outputs from A/D converters 1201.1–1201.n to detect the head position of a reception signal slot, an interface 1240 receiving and applying to synchronizing position estimation device 1230 a control signal from control PC 1100, an adaptive array processing unit 1250 receiving an output from synchronizing position estimation device 1230 to carry out adaptive array processing, and an interface 1260 applying from control PC 1100 to adaptive array processing unit 1250 a correction value for the amplitude and phase to be applied to a transmission weight, or applying the minimum square error signal (MSE) that provides an indication of a desired-directivity being achieved to the control PC in carrying out adaptive array processing at adaptive array processing unit 1250.

Although only the configuration for receiving a signal is shown in FIG. 5, adaptive array processing unit 1250 calculates, in practice, a transmission weight to provide a desired transmission directivity based on the received signal. Based on the transmission weight, a radio wave having transmission directivity for a desired terminal is output, likewise FIG. 9, with respect to the transmission signal from adaptive array radio device 1010. At this stage, the transmission weight is subjected to correction based on the correction value set forth above.

Control PC 1100 includes a central processing unit (CPU) 1102 to carry out an operation to control calibration processing set forth below in accordance with a control program, and a memory 1104 to store, in addition to the aforementioned control program, the timing adjustment with respect to A/D converters 1201.1–1201.n and the minimum square error signal in correspondence, as will be described afterwards.

Figure 6A:
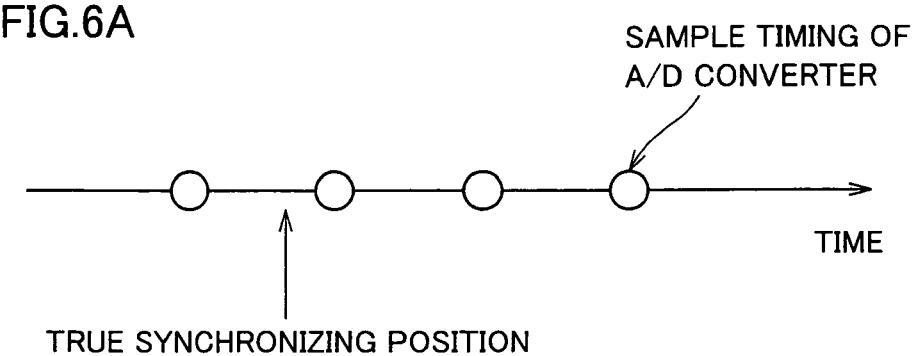
FIGS. 6A–6C are diagrams representing the sampling timing of respective elements in calibration system 1000 according to the second embodiment of the present invention.
Figure 6B:
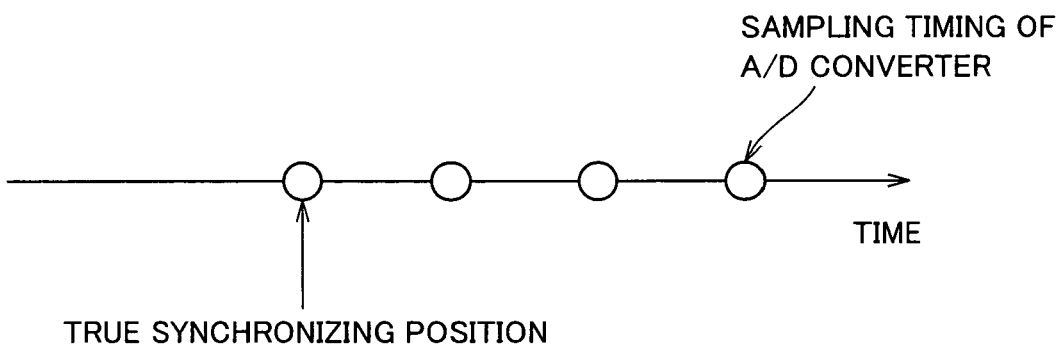
Figure 6C:
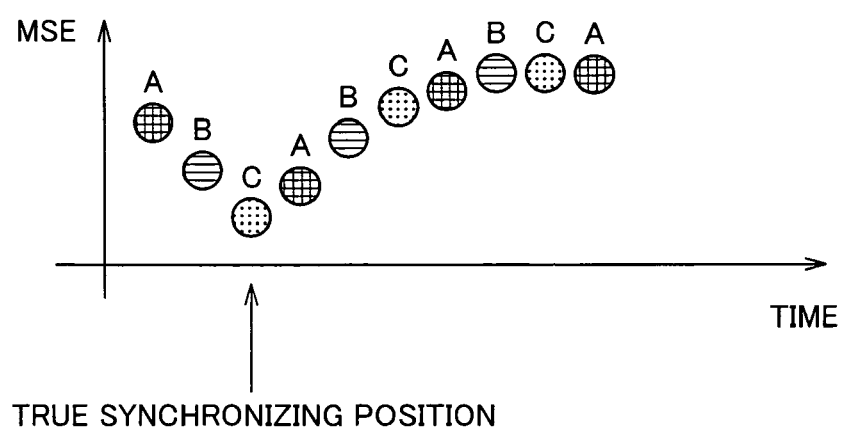
Figure 8:
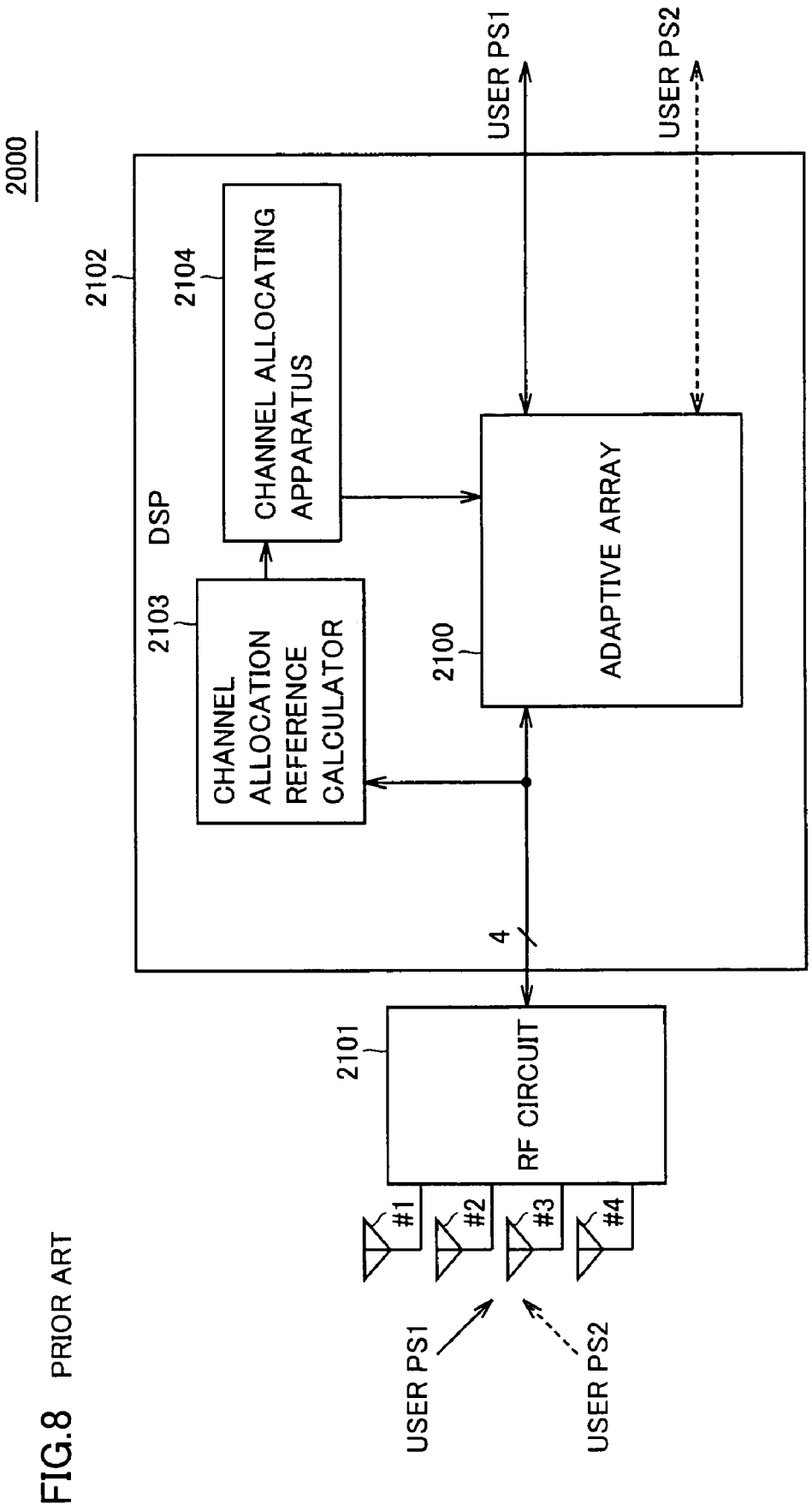
FIG. 8 is a schematic block diagram representing a configuration of a transmission and reception system 2000 of a conventional PDMA base station realized using an adaptive array radio device.

FIGS. 6A–6C represent the sampling timing of respective elements in calibration system 1000 according to the second embodiment of the present invention. FIG. 6A represents the sampling timing when phase adjustment of A/D converters 1201.1–1201.n is not conducted. FIG. 6B represents the sampling timing when phase adjustment of A/D converters 1201.1–1201.n is conducted. FIG. 6C represents the minimum square error signal value (MSE) stored in memory 0.1104 while the clock phase adjustment of A/D converters 1201.1–1201.n , i.e. sample timing adjustment, is carried out.

In the second embodiment of FIG. 5, down sampling devices such as those in the first embodiment of FIG. 2 are not provided. A/D converters 1201.1–1201.n shown in FIG. 6A have a sampling frequency lower than the sampling frequency of A/D converters 1200.1–1200.n of the first embodiment of FIG. 3A, as the frequency for calculation of adaptive array processing.

Therefore, if A/D converters 1201.1–1201.n carry out sampling at the low frequency of FIG. 6A, for example, all the data input at a frequency of high speed as shown in FIG. 6C cannot be sampled.

Therefore, in the second embodiment, sampling is carried out over a plurality of times while adjusting the sampling timing (the phase of the internal clock defining the same). Adaptive array reception is conducted for each sampling timing, and the minimum square error signal value is recorded.

In the example of FIG. 6C, the minimum square error signal values obtained by sampling at the first sampling timing are represented by the circle A. The minimum square error signal values obtained by sampling at the second sampling timing shifted in phase are represented by the circle B. The minimum square error signal values obtained by sampling at the third sampling timing further shifted in phase are represented by the circle C.

By applying the clock adjust signal that defines a sample timing corresponding to the smallest minimum square error signal value that is recorded (circle of C) shown in FIG. 6C from phase adjuster 1270 to A/D converters 1201.1–1201.n , the sampling timing is adjusted as shown in FIG. 6B.

Therefore, even if the sampling timing of A/D conversion is not an integral multiple of or 1/integer times the external clock, the true synchronizing position can be found so that calibration can be carried out.

FIG. 7 is a flow chart to describe the operation of calibration system 1000 according to the second embodiment.

Upon initiation of calibration (step S200), an instruction is output from control PC 1100 to adaptive array radio device 1010 (base station) to set the clock phase adjust value defining the sampling timing of A/D converters 1201.1–1201.n to an appropriate initial value. Adaptive array radio device 1010 receives signals (SG signals) from signal generators 1030.1 and 1030.2 to measure the minimum square error signal value (MSE), and notifies control PC 1100 the measured minimum square error signal value. Control PC 1100 stores the value of clock phase adjustment and the value of the minimum square error signal value signal in correspondence (step S202).

Control PC 1100 instructs phase adjuster 1270 in adaptive array radio device 1010 to modify the phase of the internal clock that defines the sampling timing of A/D converters 1201.1–1201.n by just 1 step corresponding to 1/integer times the time interval of sampling of A/D converters 1201.1–1201.n (step S204).

Then, adaptive array radio device 1010 receives a SG signal, measures the minimum square error signal value (MSE), and notifies control PC 1100 the newly measured minimum square error signal value. Control PC 1100 stores the value of clock phase adjustment and the value of the minimum square error signal value in correspondence (step S206).

Then, control PC 1100 determines whether the minimum square error signal value is equal to or below a predetermined value, and can be identified as the minimum value (step S208).

When not identified as the minimum, an instruction is output to further modify the sampling timing of A/D converters 1201.1–1201.n with respect to phase adjuster 1270 in adaptive array radio device 1010 by just one step corresponding to 1/integer times the time interval of sampling of A/D converters 1201.1–1201.n to an appropriate value (step S210). Then, the process returns to step S206.

When determination is made that the minimum square error signal value is equal to or below a predetermined value and can be identified as the maximum at control PC 1100, calibration is executed in a manner similar to that of the conventional case with the clock adjust value fixed corresponding to the minimum (step S212). Thus, the calibration process ends (step S214).

By the above-described configuration, calibration processing of transmission directivity of an adaptive array radio device can be carried out properly.

In the present invention, calibration processing of transmission directivity of an adaptive array radio device can be carried out properly even in the case where the sampling timing of A/D conversion in the adaptive array radio device is not an integral multiple of or 1/integer times the external clock.

Further, calibration processing of transmission directivity of an adaptive array radio device can be carried out properly even in the case where there is synchronization shift of several symbols between the adaptive array radio device and the measurement system due to aging and the like.

INDUSTRIAL APPLICABILITY

In accordance with the present invention, deviation in clock frequency between the adaptive array radio device and the measurement system can be adjusted, effective for calibration of transmission directivity of an adaptive array radio device.

The invention claimed is:

1. A radio apparatus carrying out signal reception by adaptive array processing, comprising:
 a plurality of antennas,
 signal conversion means sampling a signal from said plurality of antennas for conversion into a digital signal from an analog signal, said signal conversion means having a variable timing of sampling in accordance with a timing adjust signal, and
 adaptive array processing means for calculating, based on a signal from said signal conversion means, a reception weight to extract a desired signal, and a transmission weight to form a pattern of a desired transmission directivity,
 wherein said adaptive array processing means outputs match information that provides an indication of the desired reception directivity being achieved in calculation of said reception weight, further comprising:
 a first interface for receiving said timing adjust signal from outside said radio apparatus, and
 a second interface to output said match information outside said radio apparatus.

2. The radio apparatus according to claim 1, wherein said signal conversion means comprises
 A/D conversion means for sampling a signal from said plurality of antennas at a first frequency, and
 down sampling means for sampling at a second frequency lower than said first frequency said signal sampled at the first frequency,
 wherein said down sampling means modifies a sampling timing at said second frequency in accordance with said timing adjust signal.

3. The radio apparatus according to claim 2, wherein said down sampling means modifies a sampling timing at said second frequency in units of time intervals corresponding to said first frequency in accordance with said timing adjust signal.

4. The radio apparatus according to claim 1, wherein said signal conversion means comprises
 A/D conversion means for sampling a signal from said plurality of antennas at a first frequency, and
 means for adjusting a phase of an internal clock defining the sampling timing at the first frequency by said A/D conversion means in accordance with said timing adjust signal.

5. A calibration system to calibrate a transmission directivity of a radio apparatus that carries out signal reception by adaptive array processing using a plurality of antennas, comprising:
 control means for controlling a calibration operation, and
 a plurality of signal generation means for generating respective plurality of test signals to be applied to said radio apparatus under control of said control means,
 wherein said radio apparatus comprises
 signal conversion means sampling a signal from said plurality of antennas for conversion into a digital signal from an analog signal, said signal conversion means having a variable timing of sampling in accordance with a timing adjust signal,
 adaptive array processing means for calculating, based on a signal from said signal conversion means, a reception weight to extract a desired signal, and a transmission weight to form a pattern of a desired transmission directivity
 said adaptive array processing means outputting match information that provides an indication of the desired reception directivity being achieved in calculation of said reception weight, and further comprises
 a first interface for receiving said timing adjust signal from said control means, and
 a second interface for providing said match information to said control means,
 wherein said control means determines a level of said timing adjust signal by which the desired reception directivity is achieved, based on the correspondence between said timing adjust signal and said match information.

6. The calibration system according to claim 5, further comprising detection means, provided corresponding to at minimum one of said plurality of signal generation means, for detecting a level of a signal output from said radio apparatus with respect to a corresponding signal generation means, under control of said control means, wherein said control means determines a correction value for said transmission weight in accordance with a detected result of said detection means.

7. The calibration system according to claim 5, wherein said signal conversion means comprises
   A/D conversion means for sampling a signal from said plurality of antennas at a first frequency, and
   down sampling means for sampling at a second frequency lower than said first frequency said signal sampled at the first frequency,
   wherein said down sampling means modifies a sampling timing at said second frequency in accordance with said timing adjust signal.

8. The calibration system according to claim 5, wherein said signal conversion means comprises
   A/D conversion means for sampling a signal from said plurality of antennas at a first frequency, and
   means for adjusting a phase of an internal clock defining the sampling timing at said first frequency by said A/D conversion means in accordance with said timing adjust signal.

9. A calibration method of transmission directivity at a radio apparatus that carries out signal reception by adaptive array processing using a plurality of antennas, comprising the steps of:
   generating respective plurality of test signals to be applied to said radio apparatus,
   sampling a signal from the plurality of antennas for conversion into a digital signal from an analog signal at said radio apparatus,
   modifying a sampling timing at said signal conversion step in accordance with a timing adjust signal,
   calculating a reception weight to extract a desired signal based on said signal-converted signal to output match information that provides an indication of a desired reception directivity being achieved,
   determining a level of said timing adjust signal by which the desired reception directivity is achieved based on the corresponding relationship between said timing adjust signal and said match information, obtained by sequentially modifying a level of said timing adjust signal,
   calculating a transmission weight to form a pattern of a desired transmission directivity at said determined level of a timing adjust signal,
   detecting a level of a signal output from said radio apparatus corresponding to said transmission weight, and
   determining a correction value for said transmission weight in accordance with a detected result of said signal level.

10. The calibration method according to claim 9, wherein said signal conversion step includes the steps of
   sampling a signal from said plurality of antennas at a first frequency,
   sampling at a second frequency lower than said first frequency said signal sampled at the first frequency, and
   modifying a sampling timing at said second frequency in accordance with said timing adjust signal.

11. The calibration method according to claim 9, wherein said signal conversion step includes the steps of
   sampling a signal from said plurality of antennas at a first frequency, and
   adjusting a phase of an internal clock defining a timing of said sampling at the first frequency in accordance with said timing adjust signal.

12. A calibration program of transmission directivity at a radio apparatus that carries out signal reception by adaptive array processing using a plurality of antennas, causing a computer to execute the steps of:
   generating respective plurality of test signals to be applied to said radio apparatus,
   sampling a signal from the plurality of antennas for conversion into a digital signal from an analog signal with respect to said radio apparatus,
   modifying a sampling timing of said signal conversion step in accordance with a timing adjust signal with respect to said radio apparatus,
   calculating a reception weight to extract a desired signal based on said signal-converted signal, and outputting match information that provides an indication of a desired reception directivity being achieved with respect to said radio apparatus,
   determining a level of said timing adjust signal by which the desired reception directivity is achieved based on the corresponding relationship between said timing adjust signal and said match information, obtained by sequentially modifying the level of said timing adjust signal,
   calculating a transmission weight to form a pattern of the desired transmission directivity at said determined level of a timing adjust signal with respect to said radio apparatus,
   detecting a level of a signal output from said radio device corresponding to said transmission weight, and
   determining a correction value for said transmission weight in accordance with a detected result of said signal level.

13. The calibration program according to claim 12, wherein said signal conversion step includes the steps of:
   sampling a signal from said plurality of antennas at a first frequency,
   sampling at a second frequency lower than said first frequency said signal sampled at the first frequency, and
   modifying a sampling timing at the second frequency in accordance with said timing adjust signal.

14. The calibration program according to claim 12, wherein said signal conversion step includes the steps of
   sampling a signal from said plurality of antennas at a first frequency, and
   adjusting a phase of an internal clock defining the sampling timing at said first frequency in accordance with said timing adjust signal.

* * * * *